(12) United States Patent
Rosenback

(10) Patent No.: US 6,387,240 B1
(45) Date of Patent: May 14, 2002

(54) METHOD FOR THE REMOVAL OF SULFUR IN THE NICKEL LEACHING PROCESS

(75) Inventor: Leif Rosenback, Espoo (FI)

(73) Assignee: Outokumpu Oyj, Espoo (FI)

(*) Notice: Subject to any disclaimer, the term of this patent is extended or adjusted under 35 U.S.C. 154(b) by 0 days.

(21) Appl. No.: 09/762,443

(22) PCT Filed: Aug. 12, 1999

(86) PCT No.: PCT/FI99/00672

§ 371 Date: Mar. 16, 2001

§ 102(e) Date: Mar. 16, 2001

(87) PCT Pub. No.: WO00/09782

PCT Pub. Date: Feb. 24, 2000

(30) Foreign Application Priority Data

Aug. 17, 1998 (FI) .................................... 981760

(51) Int. Cl.$^7$ .................................................. C25C 1/08
(52) U.S. Cl. ........................ 205/594; 75/743; 423/555
(58) Field of Search .......................... 423/555; 75/743; 205/594

(56) References Cited

U.S. PATENT DOCUMENTS 4,201,648 A * 5/1980 Subramanian et al. ...... 205/589

* cited by examiner

*Primary Examiner*—Melvyn Andrews
(74) *Attorney, Agent, or Firm*—Morgan & Finnegan, L.L.P.

(57) ABSTRACT

Invention relates to a method for the removal of sulfur from the leaching cycle of nickel processes such as leaching of nickel matte. According to the method, anolyte generated in nickel electrowinning is neutralized with the aid of a calcium-based neutralizing agents, wherein sulfur is removed from the leaching cycle as gypsum.

13 Claims, 1 Drawing Sheet

METHOD FOR THE REMOVAL OF SULFUR IN THE NICKEL LEACHING PROCESS

Figure 1:
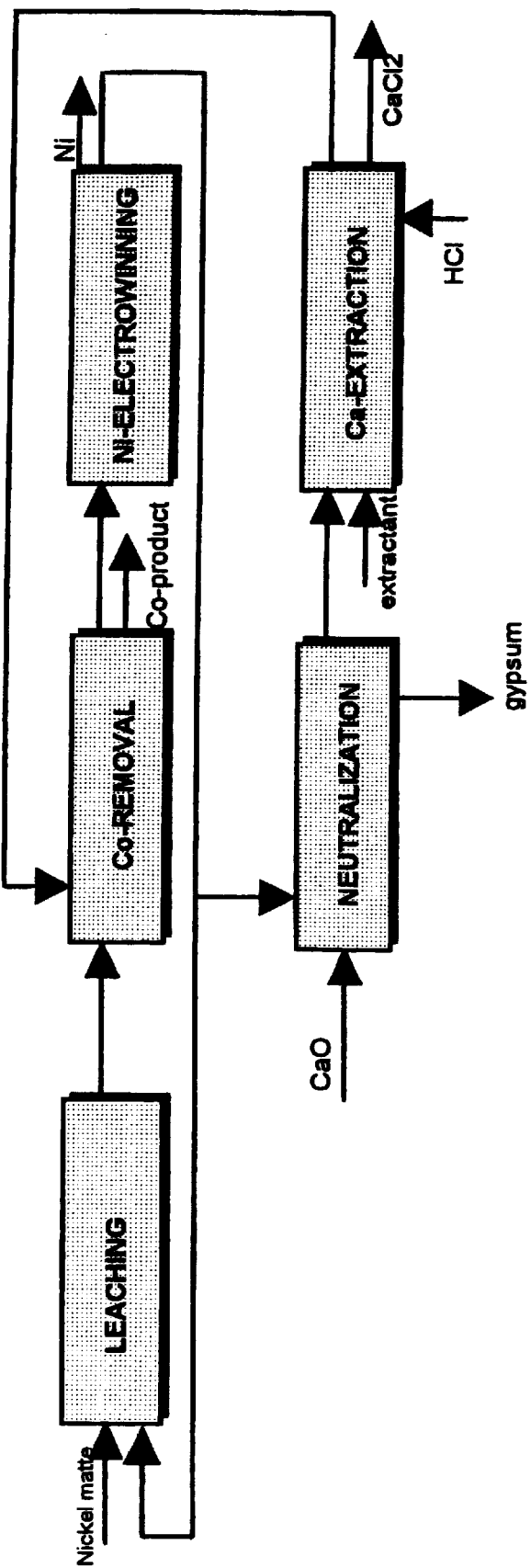

This invention relates to a method for removing sulfur generated in nickel processes, such as nickel matte leaching, from the leaching cycle. According to the method, anolyte formed in nickel electrowinning is neutralized using a lime-based neutralizing agent, wherein sulfur is removed from the leaching cycle as gypsum.

It is known before that nickel concentrates are treated pyrometallurgically first in a smelting furnace to obtain nickel matte, which has a relatively high sulfur content. The nickel matte is in turn forwarded to a converter, from where the high grade nickel matte recovered has a considerably lower amount of sulfur. Recently, the pyrometallurgical process portion of the nickel production has begun to be modernized, resulting in the exclusion of the converter altogether, and the nickel matte obtained from the first smelting furnace eg. suspension smelting furnace is routed directly for hydrometallurgical processing. Slag generated in the first smelting furnace usually undergoes further treatment in an electric furnace, from where the matte produced is also directed further for hyrdometallurgical processing. In the first smelting furnace in particular, the sulfur content of the forming nickel matte is always somewhat higher than from a converter and therefore this adds to the amount of sulfur circulating in the leaching process and may cause so-called sulfur swelling, if sulfur removal from the leaching cycle is not taken care of in some way. The problem is typical for a sulfate-based nickel leaching process.

For the purposes of hydrometallurgical processing, the nickel matte is milled and leached to an anolyte of nickel electrowinning. The leaching of nickel matte is a multi-step process and comprises several leaching steps that take place both in atmospheric and pressurized conditions. The resulting nickel sulfate solution is conducted via the solution purification step (cobalt removal) on to either nickel electrowinning or reduction with the aid of hydrogen into metal.

When the nickel sulfate solution formed in the leaching of nickel matte is conducted to electrowinning, the reaction that occurs there is as follows:

$$NiSO_4 + H_2O ==> Ni + H_2SO_4 + \tfrac{1}{2}O_2 \quad (1)$$

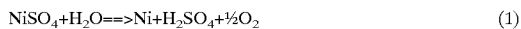

The electrodes in the electrowinning process are isolated from each other by a diaphragm. One of the main features of the process is that a certain current has to be conducted through the diaphragm so that the sulfuric acid generated in electrowinning does not come into contact with the cathode, which would result in hydrogen gas and not nickel being formed on the cathode. Thus solution flow for a specific amount of nickel is constant and a certain constant amount of anolyte is produced. The composition of the anolyte is approximately 70g/l Ni and 45–50 g/l $H_2SO_4$. As can be seen in reaction (1), the amount of sulfuric acid generated in the electrowinning is molecularly equivalent with the amount of nickel precipitated. At least a part of this oxidized sulfur should be removed from the leaching cycle as sulfate, so that nickel does not exit with the sulfate.

Removal of sulfur from the leaching cycle has been generally carried out by using sodium-based neutralizing agents (sodium carbonate, sodium hydroxide), in other words oxidized sulfur (sulfuric acid) is neutralized with sodium hydroxide or soda depending on the situation. Soluble sodium sulfate is created as a result of the neutralizing process, which under normal circumstances should be removed from the process as a by-product. However sodium sulphate is such a valuable product, that it should be marketable, and if such markets do not exist, the use of sodium-based neutralizing agents in the neutralization of sulfur is not economically viable.

In general, an obstacle to the use of lime in sulfate processes has been the gypsum precipitates which block filter and diaphragm cloths and also cause layers of gypsum nearly to hot surfaces.

A method has now been developed according to the present invention, where at least a part of the sulfur generated in the leaching of nickel matte is recovered by conducting part the anolyte from electrowinning to a secondary flow, where the sulfuric acid is neutralized with some calcium-based compound such as burnt lime (CaO) or limestone ($CaCO_3$). The neutralized solution is saturated with gypsum, and this gypsum is separated from the solution for example with an extractant so that the gypsum content of the solution remains clearly under the saturation level. The neutralized anolyte, which has had some of its gypsum separated out, is channelled back to the leaching cycle, preferably to a cobalt removal step, wherein it does not burden the actual nickel matte solution. The essential novel features of this invention will become apparent from the appended patent claims.

In the method of the present invention, the harmful effects of the gypsum created in lime precipitation can be prevented not only by precipitating and filtering the solution, but also by removing the gypsum from the saturated solution immediately after lime neutralization. Gypsum removal is carried out using a technique known as such, for example by extracting with a suitable extractant such as DEHPA, so that the gypsum content in the solution is clearly below the saturation level, which minimizes the harmful effects of the gypsum. The gypsum precipitate generated can be stored or used as a building material.

FIG. 1 shows a flow chart of the method.

The invention is further described with reference to appended flow chart shown in FIG. 1.

The leaching of nickel matte as a whole is shown simply on the chart as one step, whereas in practice it is however always a multi-step process and contains both atmospheric and pressure leaching steps. Leaching is carried out by an anolyte coning from electrowinning, which anolyte is a sulfuric acid-containing solution. The leaching steps also comprise the recovery of copper and iron, and is carried out as such in a conventional way. The nickel sulfate solution resulting from leaching is conducted to cobalt removal and the purified solution then undergoes electrolysis, which happens in electrowinning principle.

In electrowinning, the nickel is recovered as an elementary pure nickel on the cathodes and sulfuric acid is formed in the anode area. During electrowinning, the nickel content of the solution drops to about 30 g/l while the sulfuric acid content of the anolyte increases by the same amount.

A part of the anolyte is channeled back to leaching, while the other part goes to the secondary flow, which conducts it on to a separate neutralizing step, where the anolyte is neutralized by conducting some calcium-bearing neutralizing agent to it, such as finely ground lime or limestone. If, for example, burnt lime is used, the reaction is as follows:

$$H_2SO_4 + CaO ==> CaSO_4 + H_2O \quad (2)$$

The amount channelled to secondary flow is preferably 30–60% of the amount of the anolyte. The sulfuric acid in the solution is neutralized to gypsum, which is precipitated and filtered out of the cycle.

The solution exiting neutralization is saturated with gypsum (Ca=500–700 mg/l) and if it is conducted directly back to the leaching process, there is a danger that the gypsum will precipitate on to hot surfaces, cloths etc. For this reason the solution is subjected to calcium extraction with a conventional extractant such as a DEHPA reagent. The gypsum level of the solution is lowered to considerably below saturation level (Ca=50–150 mg/l), wherein the risks of precipitation are eliminated The organic phase of the calcium extraction is reextracted with a solution of hydrochloric acid, where the calcium is removed as calcium chloride. After calcium leaching, the neutralized anolyte is preferably conducted to a cobalt removal step, where the actual leaching flow of the nickel matte leaching remains essentially smaller than it would be, if the whole amount of anolyte were recirculated to the leaching.

Advantages of the method worthy of mention are that the neutralizing agent is considerably more cost effective than the neutralizing agents in current use. The amount of nickel recovered in electrowinning per certain leaching flow is constant, and since part of the anolyte solution flow is now conducted to the leaching flow coming from the matte leaching only after the proper leaching step, it. means that the nickel content of the solution coming from the leaching can be raised higher than if the entire flow were recirculated through the leaching step. Therefore, the amount of nickel to be separated in leaching (delta nickel g/l) per certain amount of solution can be raised higher than that separating in electrowinning. Because only part of the solution is recirculated back to the proper leaching step, the heating costs of solution for example can be reduced considerably. The size of the equipment in the leaching also can be reduced accordingly. The temperature of the anolyte coming from electrowinning is about 60° C. and for the purposes of leaching, it is heated up to temperatures of 90–140° C., depending on the step.

What is claimed is:

1. A method for removing sulfur generated in leaching of nickel matte from a leaching cycle of the nickel matte, which method comprises leaching the nickel matte in several steps with an anolyte of a nickel electrolysis to form a nickel sulfate solution; purifying the nickel sulfate solution and subjecting the purified nickel sulfate solution to the nickel electrolysis to recover elemental nickel and the anolyte containing the sulfur of the nickel matte as sulfuric acid; neutralizing part of the sulfuric acid of the anolyte in a neutralization step with a calcium-based neutralizing agent to produce a solution that is saturated with gypsum; and removing gypsum from the gypsum saturated solution before recycling the neutralized anolyte to the leaching cycle.

2. A method according to claim 1, wherein a part of the sulfuric acid of the anolyte is neutralized in the neutralization step with the calcium-based neutralizing agent.

3. A method according to claim 2, wherein 30–60% of the sulfuric acid of the anolyte is neutralized in the neutralization step with the calcium-based neutralizing agent.

4. A method according to claim 1, wherein the calcium-based neutralizing agent is lime (CaO).

5. A method according to claim 1, wherein the calcium-based neutralizing agent is limestone ($CaCO_3$).

6. A method according to claim 1, wherein the calcium-based neutralizing agent is lime (CaO) and limestone ($CaCO_3$) together.

7. A method according to claim 1, wherein the gypsum is separated from the gypsum saturated solution with an extraction reagent so that the gypsum concentration is depleted below the saturation level of the gypsum saturated solution.

8. A method according to claim 7, wherein said extraction agent is di (2-ethylhexyl) phosphoric acid.

9. A method according to claim 7, wherein calcium is removed from the extracted gypsum as calcium chloride.

10. A method according to claim 1, wherein after separating the gypsum from the neutralized anolyte, removing cobalt from the neutralized anolyte from which the gypsum has been separated out in a cobalt removing step.

11. A method according to claim 7 wherein the neutralized anolyte is conducted after calcium extraction to the solution purification.

12. A method according to claim 1, wherein the calcium concentration of the gypsum saturated solution is between 500 and 700 mg/l.

13. A method according to claim 7, wherein the calcium concentration is depleted to between 50 and 150 mg/l.

* * * * *